(12) United States Patent
Eisenhower, Jr.

(10) Patent No.: US 6,964,198 B2
(45) Date of Patent: Nov. 15, 2005

(54) SENSOR TESTING SYSTEM AND METHOD

(75) Inventor: Gary W. Eisenhower, Jr., Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 51 days.

(21) Appl. No.: 10/787,466

(22) Filed: Feb. 25, 2004

(65) Prior Publication Data
US 2005/0183509 A1 Aug. 25, 2005

(51) Int. Cl.$^7$ .............................................. H01L 41/08
(52) U.S. Cl. ........................... 73/717; 73/753; 310/313
(58) Field of Search .................... 73/700, 753, 745, 73/717; 310/313

(56) References Cited

U.S. PATENT DOCUMENTS

| | | | |
|---|---|---|---|
| 4,216,401 A | 8/1980 | Wagner | 310/313 R |
| 4,454,440 A | 6/1984 | Cullen | 310/313 R |
| 4,978,941 A | 12/1990 | Brown | 340/447 |
| 5,821,425 A | 10/1998 | Mariani et al. | 73/703 |
| 6,079,276 A | 6/2000 | Frick et al. | 73/718 |
| 6,218,936 B1 | 4/2001 | Imao | 340/447 |
| 6,259,360 B1 | 7/2001 | Takamura | 340/445 |
| 6,450,021 B1 | 9/2002 | Katou et al. | 73/146.5 |
| 6,484,585 B1 | 11/2002 | Sittler et al. | 73/718 |
| 6,535,824 B1 * | 3/2003 | Mansky et al. | 702/30 |
| 6,571,638 B2 | 6/2003 | Hines et al. | 73/702 |
| 2002/0032531 A1 * | 3/2002 | Mansky et al. | 702/21 |
| 2003/0101006 A1 * | 5/2003 | Mansky et al. | 702/30 |
| 2005/0103110 A1 * | 5/2005 | Ernsberger et al. | 73/708 |

* cited by examiner

Primary Examiner—William Oen
Assistant Examiner—Andre Allen
(74) Attorney, Agent, or Firm—Kris T. Fredrick; Kermit D. Lopez; Luis M. Ortiz

(57) ABSTRACT

In general, a pressure rail can be provide, which includes one or more pressure inlets and a plurality of pressured cavities formed therein. Housing components can be respectively located atop the pressured cavities, such that each housing component is sealed to a respective pressurized cavity. A connector component can be threaded into the top of each housing component for attachment to a sensor (e.g., a SAW sensor) for testing thereof. Each housing component can be configured from a clear thermoplastic material, which protects the housing components from RF frequencies, and high temperature and pressure conditions.

20 Claims, 4 Drawing Sheets

TOP VIEW

SENSOR TESTING SYSTEM AND METHOD

TECHNICAL FIELD

Embodiments are generally related to sensing methods and systems. Embodiments are also related to pressure and temperature sensors. Embodiments are additionally related to surface acoustic wave (SAW) devices and sensors, and particular to SAW button sensors and testing techniques thereof.

BACKGROUND OF THE INVENTION

Various sensors are known in the pressure and temperature sensing arts. The ability to detect pressure and/or temperature is an advantage to any devices which are under constant temperature and which can be severely affected by temperature conditions. An example of such a device is an automobile tire, which of course, experiences variations in both temperature and pressure. Many different techniques have been proposed for sensing the pressure and/or temperature in tires, and for delivering this information to the operator at a central location on the vehicle so that he knows that a tire is at low or high air pressure.

Such sensors generally communicate with the vehicle so that the sensed pressure and/or temperature are displayed to the operator when the vehicle is moving, i.e. the wheel rotating relative to the body of the vehicle. Such devices are generally relatively complex and expensive or alternatively are not particularly robust.

Some tire pressure and/or temperature sensor systems incorporate a sensor that is fixed to the body so no rotating electrical contact between the rotating wheel and the chassis is required. In this system, a sensor rod is deflected by contact with the tire sidewall when the sidewall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of fixed sensor the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some pressure sensor systems utilize a rotating encoder formed by a multi-polar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multi-polar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce.

One type of sensor that has found wide use in pressure and temperature sensing applications, such as, vehicle tires, is the Surface Acoustic Wave (SAW) sensors, which can be composed of a sense element on a base and pressure transducer sensor diaphragm that is part of the cover. For a SAW sensor to function properly, the sensor diaphragm should generally be located in intimate contact with the sense element at all pressure levels and temperatures.

To compensate for expansion in the packaging, the sense element and sensor diaphragm must be preloaded when they are assembled to shift the output frequency a known amount, which ensures contact at all times. In conventional sensor designs, an interference fit between the cover and base can maintain a preload until the cover and base are locked in place by welding, soldering or other connecting means.

In order to properly configure a sensor, such as a SAW sensor, the sensing device must undergo rigorous testing to ensure that the device will work properly under a variety of temperature and pressure conditions. It is necessary to test the sensor to verify functionality over variations in temperature and pressure, and also to ensure that the sensor external components (e.g., sensor housing) can withstand these varied conditions.

Additionally, tests must be performed to ensure that sensor device components such as the housing will not be affected by RF frequencies due tot eh present of wireless components, such as antennas. The housing and base of the sensor must also not be placed into a condition in which an electrical short runs from the housing to the base, causing a frequency shift or error in the sensor measurements. A need thus exists for an improved method and system for properly testing sensor devices, such as SAW sensors.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor testing method and system.

It is another aspect of the present invention to provide for a sensor testing method and system, which can be utilized to rest the effectiveness of surface acoustic wave (SAW) sensor devices.

The aforementioned aspects of the invention and other objectives and advantages can now be achieved as described herein. A sensor testing system and method are disclosed herein. In general, a pressure rail can be provide, which includes one or more pressure inlets and a plurality of pressured cavities formed therein. Housing components can be respectively located atop the pressured cavities, such that each housing component is sealed to a respective pressurized cavity. A connector component can be threaded into the top of each housing component for attachment to a sensor (e.g., a SAW sensor) for testing thereof. Each housing component can be configured from a clear thermoplastic material, which protects the housing components from RF frequencies, and high temperature and pressure conditions.

Such a connector component can be formed as a BNC connector which attaches to a printed circuit board of the sensor to be tested, along with and a plurality of wires associated with the sensor. Each printed circuit board can include two female sockets soldered to the printed circuit board that respectively accept a pin associated with a base of the sensor. Additionally, each pressurized cavity among can be filled with an epoxy for sealing each respective housing component to the BNC connector to prevent pressure leakage. The epoxy can be configured as a high-temperature epoxy. The pressure rail can be configured from aluminum and can form, for example, an aluminum plate. Additionally, a plurality of O-ring grooves can be provided, wherein each O-ring groove is respectively milled about each pressurized cavity in order to seal the pressure rail to the housing components. Each pressurized cavity functions as a pressure channel that permits pressure to be applied in each of the pressurized cavities milled into the top surface of the aluminum plate.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
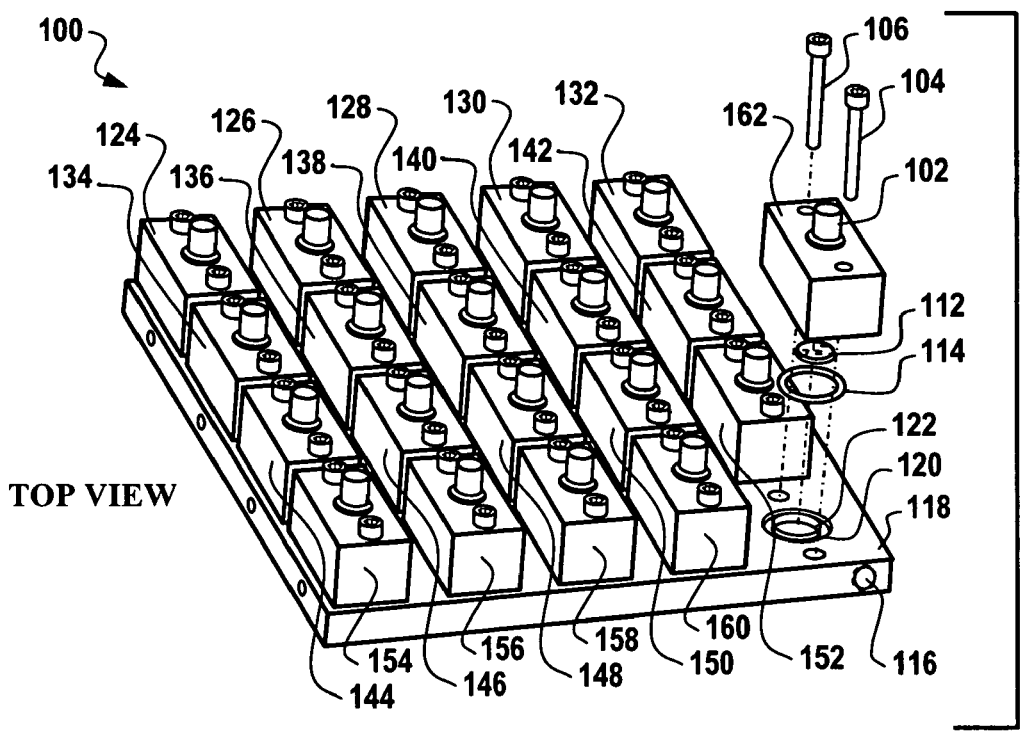
FIG. 1 illustrates a top perspective view of a sensor testing system, which can be implemented in accordance with a preferred embodiment of the present invention.
Figure 2:
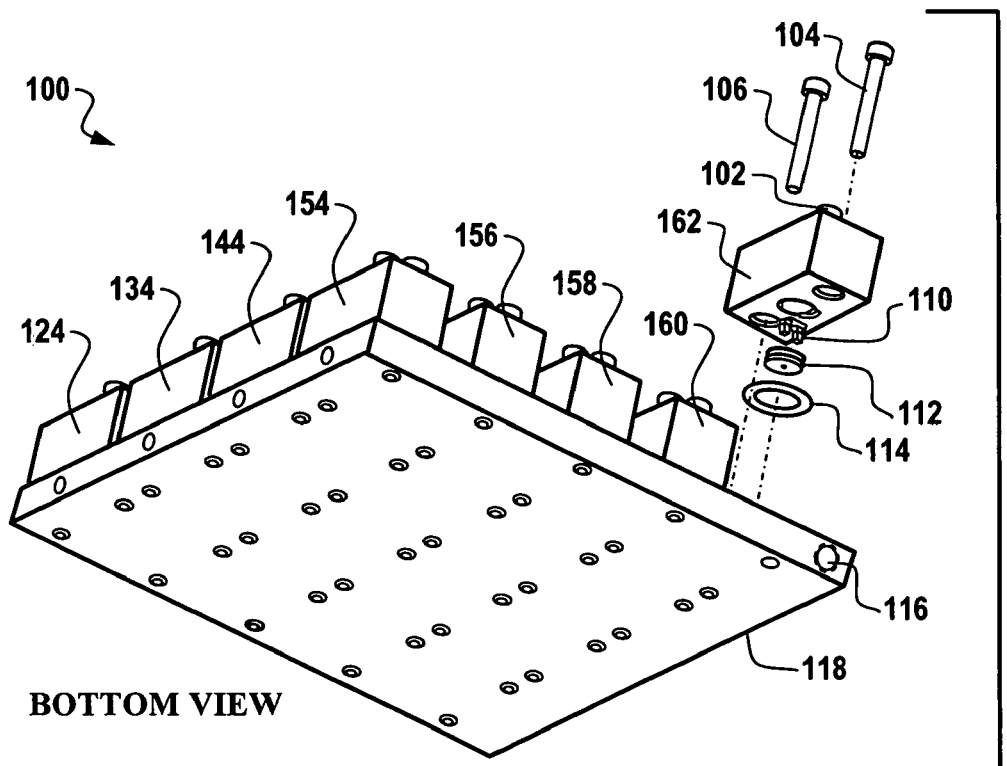
FIG. 2 illustrates a bottom perspective view of the sensor testing system depicted in FIG. 1, in accordance with a preferred embodiment of the present invention.

FIG. 1 illustrates a top perspective view of a sensor testing system 100, which can be implemented in accordance with a preferred embodiment of the present invention. FIG. 2 illustrates a bottom perspective view of the sensor testing system 100 depicted in FIG. 1, in accordance with a preferred embodiment of the present invention. Note that in both FIGS. 1 and 2, similar or identical parts or elements are indicated generally by identical reference numerals. System 100 generally comprises a pressure rail 118 having a plurality of pressurized cavities, such as cavity 122, formed therein. Pressure rail 118, which can be formed from aluminum, generally comprises one or more pressure inlets, such as, for example, inlet 116. Each inlet is formed from pressure rail 118.

System 100 also comprises a plurality of housing components 124, 126, 128, 130, 132, 134, 136, 138, 140, 142, 144, 146, 148, 150, 152, 154, 156, 158, 160, and 162. Each housing component 124, 126, 128, 130, 132, 134, 136, 138, 140, 142, 144, 146, 148, 150, 152, 154, 156, 158, 160, and 162 is respectively located atop each cavity among the plurality of pressured cavities. Each housing component 124, 126, 128, 130, 132, 134, 136, 138, 140, 142, 144, 146, 148, 150, 152, 154, 156, 158, 160, and 162 is sealed to a respective pressurized cavity among the plurality of pressurized cavities.

A connector component 102 can be threaded into the top of representative housing component 162, which can be configured from a clear thermoplastic material, such as, for example, LEXAN®, which can be utilized to protect housing component 162 from RF frequencies, and high-temperature and high-pressure conditions. Note that LEXAN® is a type of engineering thermoplastic. LEXAN® is a tough and versatile polymer. The trademark LEXAN® is owned by the General Electric Company. It can be appreciated that materials other than LEXAN® can also be utilized to implement housing components, such as housing component 162, and that LEXAN® is referred to herein for illustrative purposes only.

Connector component 102 can be configured as a BNC connector which attaches to a printed circuit board 110 associated with sensor 112 and a plurality of wires (not shown in FIGS. 1–2), which are also associated with sensor 112. Note that an example of such a printed circuit board is shown and described in greater detail herein with respect to FIG. 5.

Sensor 112 can be configured as a SAW button assembly located within an O-ring 114. A detailed example of a SAW button assembly is shown and described in greater detail herein with respect to FIG. 6. Note that each printed circuit board such as printed circuit board 110 can comprise two female sockets, which are soldered to the printed circuit board in order to respectively accept a pin associated with a base of the sensor 112. Similar features can be implemented for each housing component 124, 126, 128, 130, 132, 134, 136, 138, 140, 142, 144, 146, 148, 150, 152, 154, 156, 158, and 160. Each housing can be secured to pressure rail 118 via a plurality of cap screws, such as, for example, cap screws 104 and 106. In the example depicted in FIGS. 1–2, cap screws 104 and 106 are utilized to connect housing component 162 to pressure rail 118.

In general, each pressurized cavity (e.g., cavity 122) can be filled with a high-temperature epoxy for sealing each respective housing component (e.g., 162) to connector component (e.g., connector component 102) to prevent pressure leakage. System 100 also includes a plurality of O-ring grooves, wherein each O-ring groove is respectively milled about each pressurized cavity in order to seal the pressure rail to the housing components 124, 126, 128, 130, 132, 134, 136, 138, 140, 142, 144, 146, 148, 150, 152, 154, 156, 158, 160, and 162. An example of one such O-ring groove is O-ring groove 120 in which O-ring 114 is located. Each O-ring such as O-ring 114 can be formed from silicone. Each pressurized cavity, such as, for example, cavity 122, can be configured in the shape of a pressure channel that permits pressure to be applied in each of the pressurized cavities milled into the top surface of the pressure rail 118.

Figure 3:
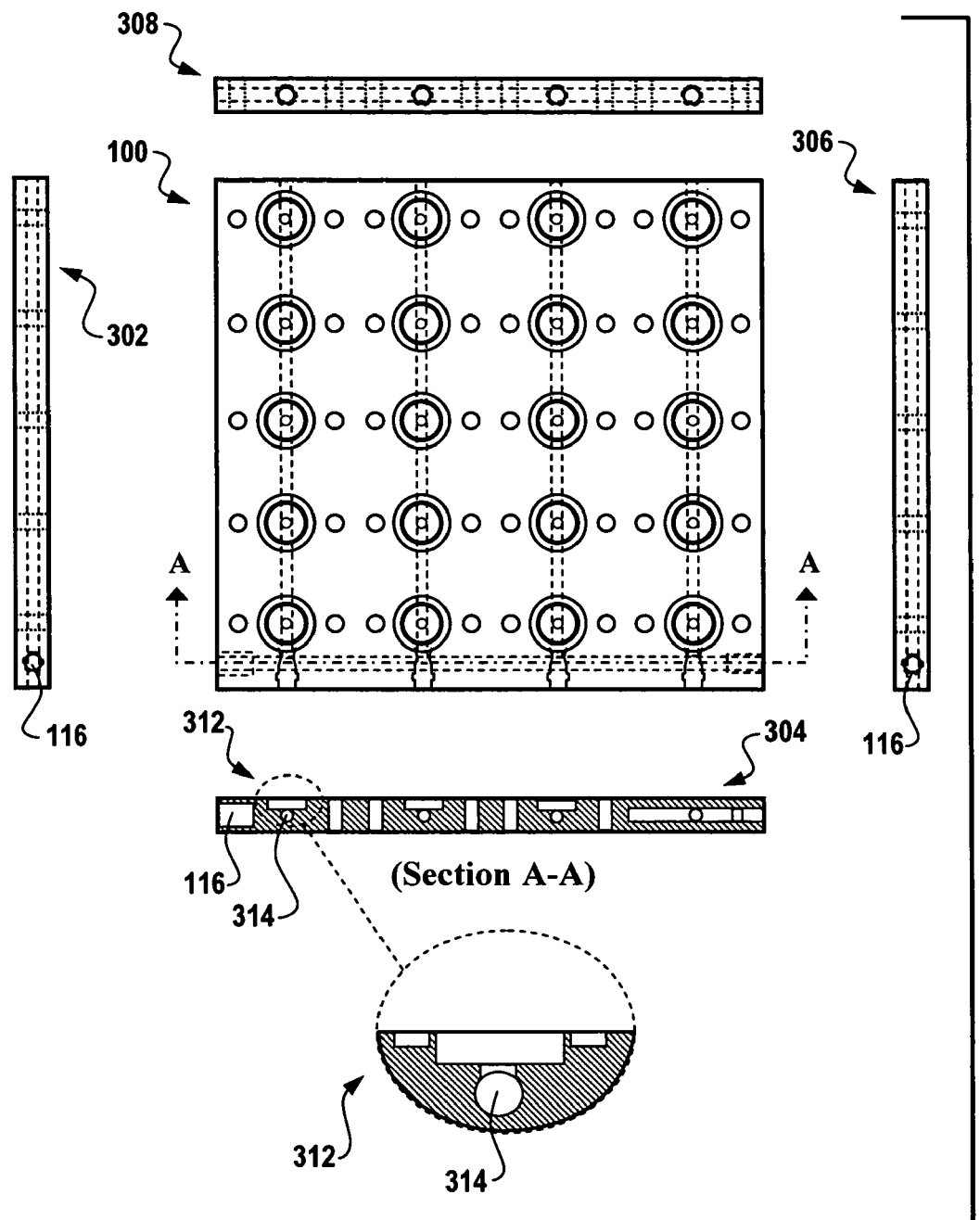
FIG. 3 illustrates a pictorial diagram depicting top and side views of the system depicted in FIGS. 1–2, in accordance with a preferred embodiment of the present invention.

FIG. 3 illustrates a pictorial diagram depicting top and side views of the system 100 depicted in FIGS. 1–2, in accordance with a preferred embodiment of the present invention. Note that in FIGS. 1–3, similar or identical parts or elements are generally indicated by identical reference numerals. Thu, a top view of system 100 is shown surrounded by side views 302, 304, 306, and 308 of system 100. View 314, for example, shows a side sectional A—A view of system 300, along with a detail of portion 312 of system 100, which includes an example inlet 314.

Figure 4:
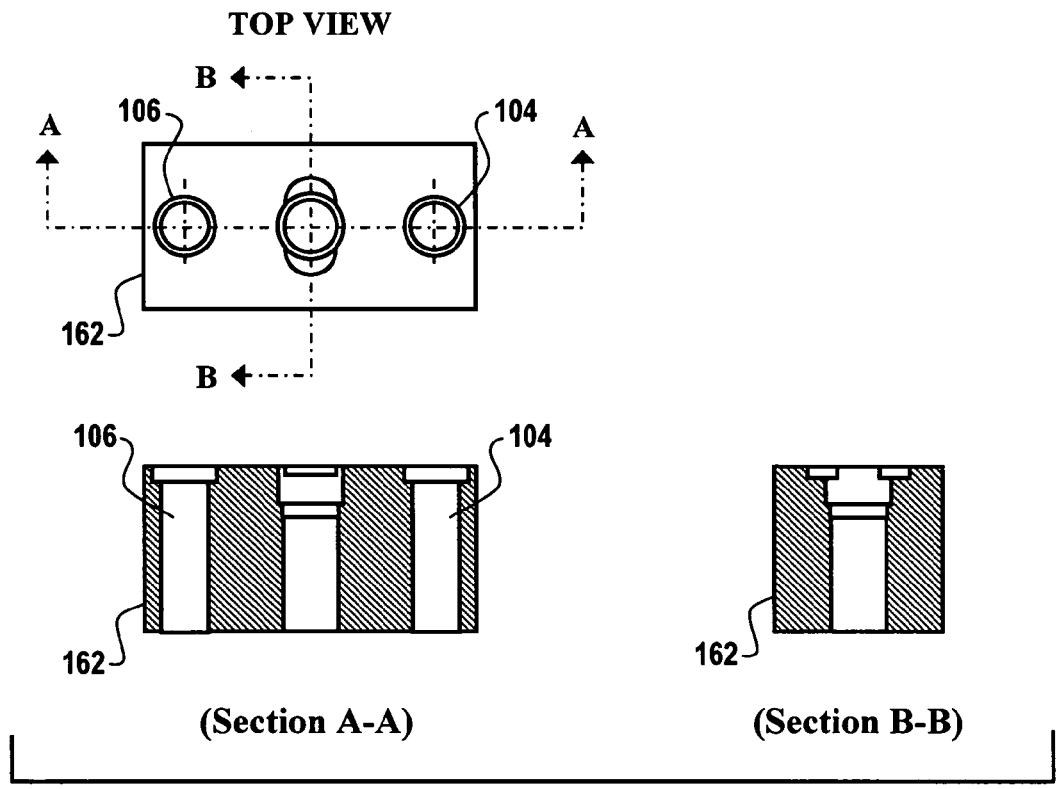
FIG. 4 illustrates top and side sectional views of a housing component, in accordance with a preferred embodiment of the present invention.

FIG. 4 illustrates top and side sectional views of housing component 162, in accordance with a preferred embodiment of the present invention. Note that in FIGS. 1–4, similar or identical parts or elements are generally indicated by identical reference numerals. Housing component 162 of FIGS. 1–2 is thus shown in greater detail in FIG. 4, including a top A—A and B—B view, a section sectional A—A view, and a side section B—B view.

Figure 5:
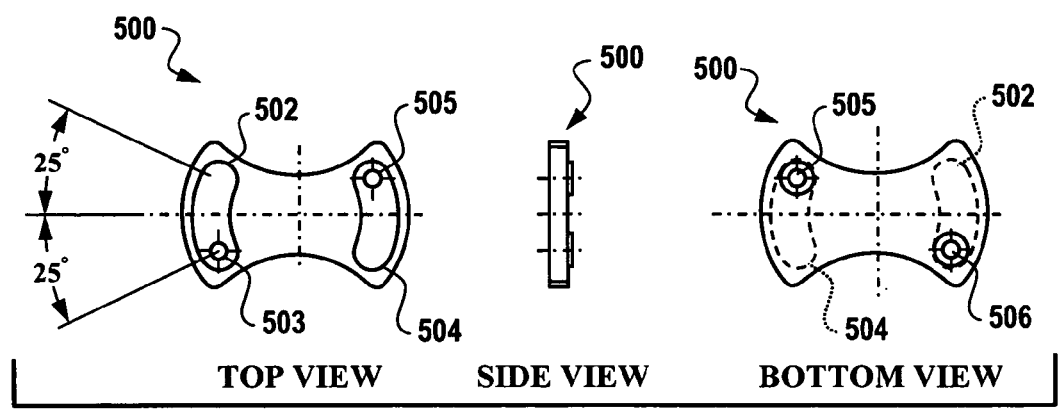
FIG. 5 illustrates top, bottom and side views of a printed circuit board with female sockets, which can be implemented in accordance with a preferred embodiment of the present invention.

FIG. 5 illustrates top, bottom and side views of a printed circuit board 500 with female sockets 503 and 505, which can be implemented in accordance with a preferred embodiment of the present invention. Note that printed circuit board 500 of FIG. 5 is analogous to printed circuit board 110 of FIG. 1. Female sockets 503 and 505 are respectively located within portions 502 and 504 of printed circuit board 500. The two female sockets 503 and 505 are generally soldered in place on the printed circuit board 500 to accept two pins (not shown in FIG. 5) located on the base of the sensor (e.g., sensor 112 to be tested. An example of such pins is shown and described in greater detail herein with respect to FIG. 6.

Figure 6:
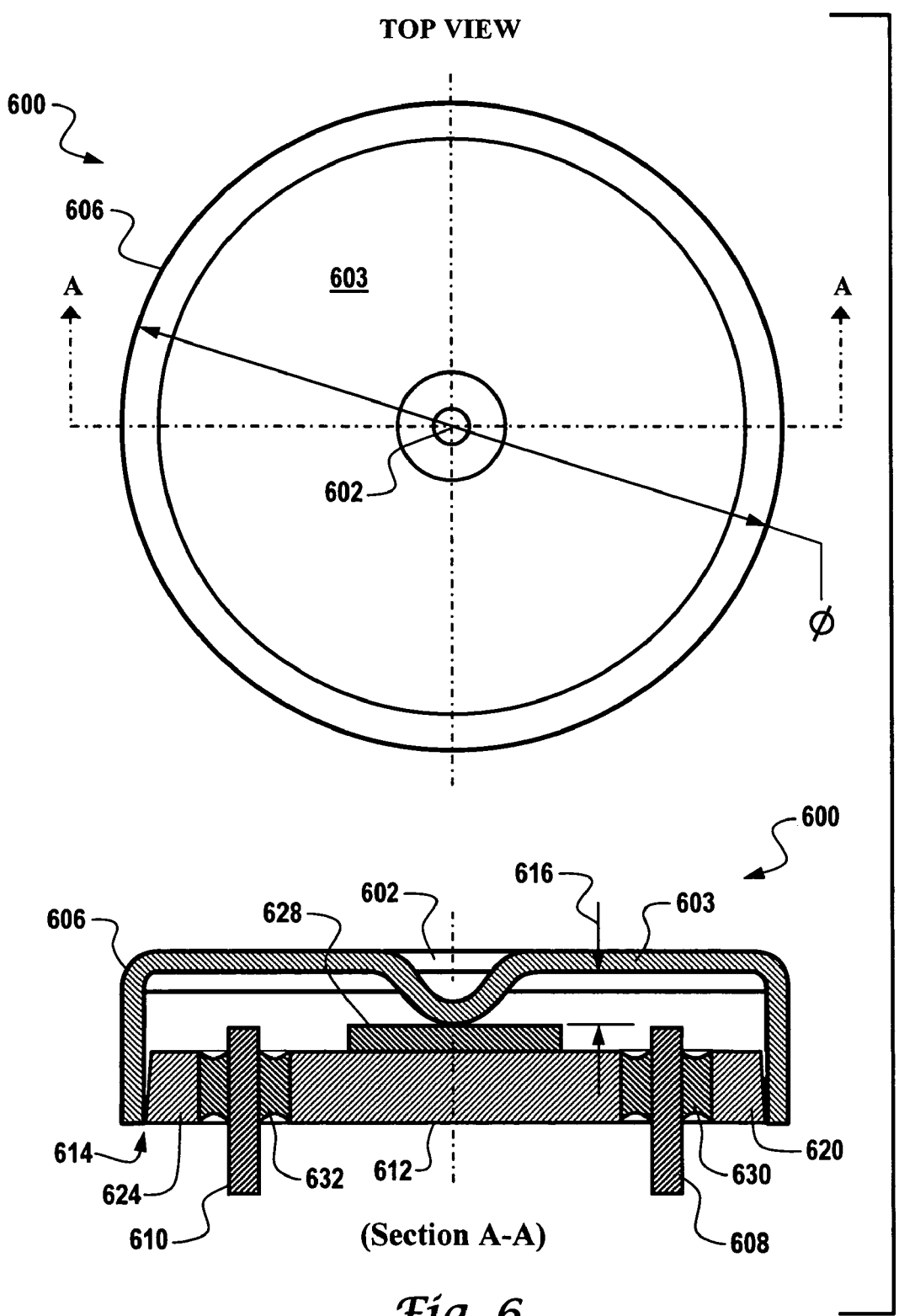
FIG. 6 illustrates top and side views of a sensor, which can be tested by the testing system depicted in FIGS. 1–3, in accordance with a preferred embodiment of the present invention.

FIG. 6 illustrates top and side views of a sensor 600, which can be tested by the testing system 100 depicted in FIGS. 1–3, in accordance with a preferred embodiment of the present invention. Note that sensor 600 of FIG. 6 is analogous to sensor 112 depicted in FIG. 2. Thus, sensor 600 can be implemented as or in place of sensor 112. Sensor 600 generally comprises a SAW button sensor or sensory assembly. In general, sensor 600 includes a sensor base which is composed of base portions 620, 612 and 624. Two pins 608 and 610 can be mounted and/or connected to the sensor base. Such pins 608 and 610 can be located within areas 630 and 632 of the sensor base. Sensor 600 generally includes a sensor cover 606 which can be configured to include a dimple 602. Note that the particular shape and size of dimple 602 can vary, depending on particular applications. The dimple 602 depicted in FIG. 6 is thus presented for illustrative purposes only and the size and shape thereof are not considered limiting features of the present invention.

A sensor element 628 can be located adjacent to or on base portion 612 in a manner that that permits clearances to form between sensor cover 606 and the sensor base composed of base portions 620, 612 and 624. A sensor diaphragm 603 can be incorporated into the sensor cover 606. The cover 606 can be located the sensor base such that the dimple 602 is in intimate contact with the sensor element 628 at all pressure levels and temperatures thereof.

It can be appreciated from FIG. 6, that instead of using an interference fit between the cover and base, the components thereof can be designed to form a clearance or gap between the cover and base. Such a design does not rely on an interference between the two parts to maintain preload, but instead can utilize welding, soldering or other connecting means to lock the components in position at the time the cover is assembled to the base.

The components can be designed such that even if the cover is at its smallest inside dimension within the tolerance range and the base is at its largest outside dimension within the tolerance range there will be clearance between them when they are assembled together. Thus, a clearance should exist generally between the cover and base even if the cover is at its smallest dimension within the tolerance range and the base is at its largest dimension within the tolerance range. The intent of such a feature is to produce the parts at their nominal dimension.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A sensor testing system, comprising:
a pressure rail having at least one pressure inlet and a plurality of pressured cavities formed therein;
a plurality of housing components respectively located atop said plurality of pressured cavities, wherein each housing component among said plurality of housing component is sealed to a respective pressurized cavity from among said plurality of pressurized cavities;
a connector component threaded into a top of each housing component among said plurality of housing components for attachment to a sensor for testing thereof.

2. The system of claim 1 wherein each housing component among said plurality of housing components is configured from a clear thermoplastic material, which protects each housing component from RF frequencies, and high temperature and pressure conditions.

3. The system of claim 1 wherein said connector component comprises a BNC connector which attaches to a printed circuit board of said sensor and a plurality of wires associated with said sensor.

4. The system of claim 3 wherein said printed circuit board comprises two female sockets soldered to said printed circuit board that respectively accept a pin associated with a base of said sensor.

5. The system of claim 3 wherein each pressurized cavity among said plurality of pressurized cavities is filled with an epoxy for sealing each respective housing component to said BNC connector to prevent pressure leakage.

6. The system of claim 5 wherein said epoxy comprises a high-temperature epoxy.

7. The system of claim 1 wherein said pressure rail if configured from aluminum.

8. The system of claim 1 further comprising a plurality of O-ring grooves, wherein each O-ring groove among said plurality of O-ring grooves is respectively milled about each pressurized cavity among said plurality of pressurized cavities in order to seal said pressure rail to said plurality of housing components.

9. The system of claim 8 wherein said pressure rail comprises an aluminum plate.

10. The system of claim 9 wherein each pressurized cavity among said plurality of pressurized cavities comprises a pressure channel that permits pressure to be applied in each of said pressurized cavities milled into a top surface of said aluminum plate.

11. The system of claim 1 wherein sensor comprises a SAW sensor.

12. A SAW sensor testing system, comprising:
 a SAW sensor comprising a printed circuit board and a SAW sensor base, wherein said printed circuit board comprises two female sockets soldered to said printed circuit board that respectively accept a pin associated with said SAW sensor base;
 a pressure rail having at least one pressure inlet and a plurality of pressured cavities formed therein;
 a plurality of housing components respectively located atop said plurality of pressured cavities, wherein each housing component among said plurality of housing component is sealed to a respective pressurized cavity from among said plurality of pressurized cavities, wherein each housing component among said plurality of housing components is configured from a clear thermoplastic material, which protects each housing component from RF frequencies, and high temperature and pressure conditions;
 a connector component threaded into a top of each housing component among said plurality of housing components for attachment to said SAW sensor for testing said SAW sensor, wherein said connector component comprises a BNC connector which attaches to said printed circuit board of said SAW sensor and a plurality of wires associated with said SAW sensor.

13. A sensor testing method, comprising the steps of:
 providing a pressure rail having at least one pressure inlet and a plurality of pressured cavities formed therein;
 locating a plurality of housing components respectively atop said plurality of pressured cavities, wherein each housing component among said plurality of housing component is sealed to a respective pressurized cavity from among said plurality of pressurized cavities; and
 threading a connector component into a top of each housing component among said plurality of housing components for attachment to a sensor for testing of said sensor.

14. The method of claim 13 further comprising the step of configuring each housing component among said plurality of housing components from a clear thermoplastic material, which protects each housing component from RF frequencies, and high temperature and pressure conditions.

15. The method of claim 13 further comprising the step of configuring said connector component as a BNC connector, which attaches to a printed circuit board of said sensor and a plurality of wires associated with said sensor.

16. The method of claim 15 wherein said printed circuit board comprises two female sockets soldered to said printed circuit board that respectively accept a pin associated with a base of said sensor.

17. The method of claim 15 further comprising the step of filling each pressurized cavity among said plurality of pressurized cavities with an epoxy for sealing each respective housing component to said BNC connector to prevent pressure leakage.

18. The method of claim 17 wherein said epoxy comprises a high-temperature epoxy.

19. The method of claim 13 further comprising the step of initially forming said pressure rail from aluminum.

20. The method of claim 1 further comprising the steps of:
 configuring said pressure rail as in a form of an aluminum plate; and
 providing a plurality of O-ring grooves, wherein each O-ring groove among said plurality of O-ring grooves is respectively milled about each pressurized cavity among said plurality of pressurized cavities in order to seal said pressure rail to said plurality of housing components.

* * * * *